INVENTOR
T. H. A. CORNALBA

Patented Dec. 27, 1949

2,492,270

UNITED STATES PATENT OFFICE 2,492,270

STEREO-OPTICAL SYSTEM

Tulio Humberto Antonio Cornalba, Buenos Aires, Argentina

Application September 26, 1946, Serial No. 699,446
In Argentina April 15, 1946

2 Claims. (Cl. 88—16.6)

The present invention refers to a stereo-optical system.

The system object of this invention is based on the following considerations:

Given a magnifying lens in the focal plane, or focal surface, of which motive elements have been arranged, it is seen that:

(1) When the motive element is a single luminous image, such as for example photographic or cinematographic views projected on a suitable surface adapted to bear indicia placed within the focal plane or focal surface of the magnifying lens, the system permits the appreciation by one or more observers, and by unaided sight, of a sensation of plasticity and relief of the objects represented by the projected image; the stereo-optical system thus defined will hereinafter be called "perspective relief," its theoretical foundation lying in the incidence of equal perspectives in corresponding regions of both retinas of each observer.

(2) When the motive element is not formed by a single luminous image, such as in the former case, but by two luminous images which correspond to an "angular stereoscopy" view that is to say, the double image of the same object taken by means of two cameras (photographic, cinematographic, etc.) placed in such a manner that the optical axes of their respective objectives intersect to form a certain angle between them, or a common sterescopic view, that is to say, the double image of the same object taken by means of two cameras (photographic, cinematographic, etc.) placed in such a manner that the optical axes of their respective objectives are parallel to each other, which luminous images are in the focal plane of the magnifying lens, and when two eliminating devices are placed before each observer in accordance with the present invention, the purpose of said eliminating devices being to intercept unnecessary images, the optical sensation obtained by the unaided eye of each observer is one of stereoscopic or three-dimensional relief of the objects that have been photographed; this stereo-optical system will hereinafter be termed "angular stereoscopic relief."

A magnifying lens may be plane-convex, biconvex or concave-convex.

From what has been so far set forth it may be inferred that by installing magnifying lens means in a large hall such as a theatre or cinema, together with the necessary units placed within its focal plane or focal surface, corresponding eliminating devices have been provided at each observation post, the perception of "angular stereoscopic relief" will be possible. The main practical purpose of said stereo-optical system is its application to cinematography or television shows.

Such "angular stereoscopic relief," apart from cinematography and television, has an important application in videotelephone receivers; also, said system may be applied to the observation of stereoscopic photographs, of drawings and various perspectives.

In my system of "angular stereoscopic relief," the cinematographic or photographic views to be observed may be of the colored or of the black-and-white type. Furthermore, my system has the advantage that, whatever the position of the observer may be within the visual field of the system, said observer will see the images or projected images under a constant angular aperture; another advantage of said system resides in the fact that the crystalline lenses of the eyes of the onlookers are accommodate to infinity, thus resting the ciliary muscles. On the other hand, my system makes it possible, in accordance with its peculiarities, for the premises, where the onlookers are stationed, to remain illuminated.

In order that the present invention may be clearly understood and readily put into effect, same will now be described with reference to attached drawings illustrating an example of preferred embodiment thereof. In said drawings.

Like references represent the same or similar parts throughout the several figures of the drawings.

Figure 1:
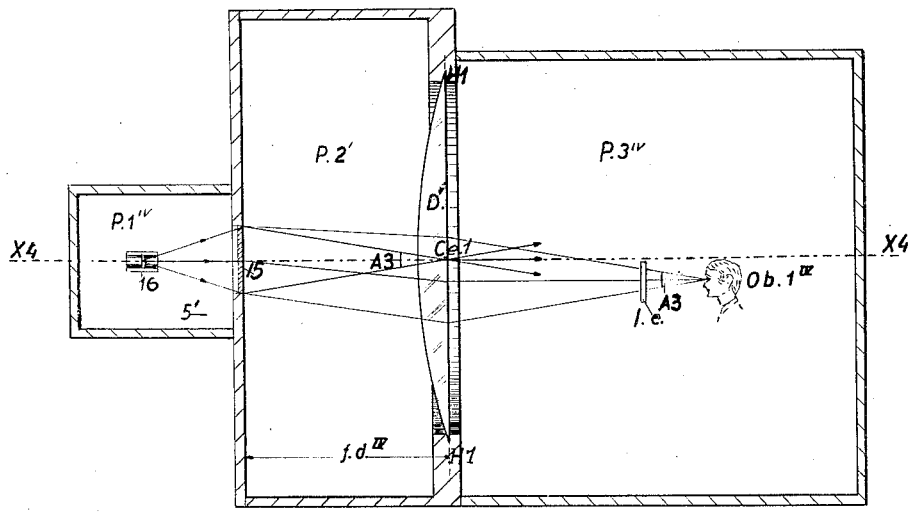
Figure 1 is a section I—I—I—I of Figure 2 of the "angular stereoscopical relief."
Figure 2:
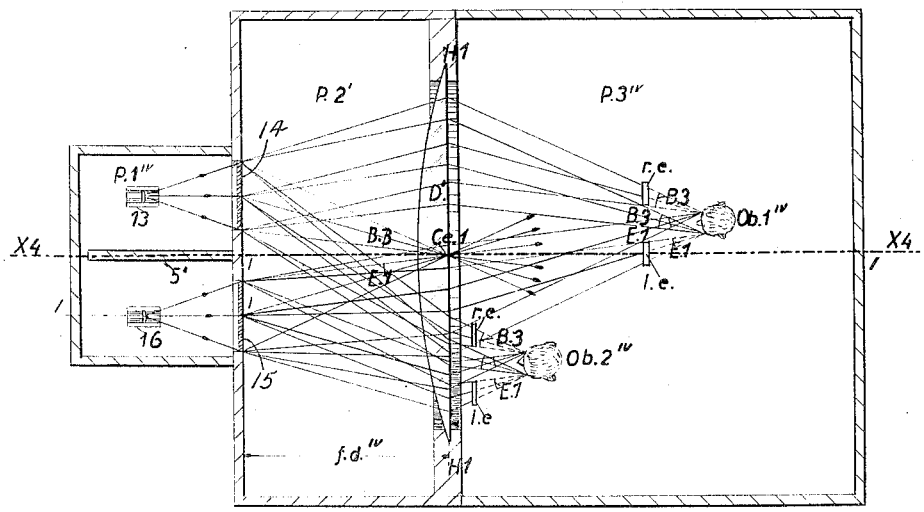
Figure 2 is a section through an "angular stereoscopical relief," system by horizontal plane passing through symmetrical axis $X_4$—$X_4$.

The system illustrated in Figs. 1 and 2 is arranged as follows: The hall where said variation is to be applied, is provided with a magnifying lens D', while a surface adapted to bear indicia and comprising a pair of relatively wide side portions, such as translucent screens 15 and 14 separated by a relatively narrow center portion 17 are preferably placed at focal distance $f.d^{iv}$ of lens D', measured on axis $X_4$—$X_4$, and perpendicularly to same. In order to illustrate the run of the rays, lens D' has been replaced in Figures 1 and 2 by plane H1—H1. Magnifying lens D' may be plane-convex, bi-convex or concave-convex. Point Ce.1 is the optican centre of lens D'; P.1$^{iv}$ is the projection booth; P.2' is a chamber, opposite walls of which support lens D' and screens 15 and 14; P.3$^{iv}$ the premises reserved for the binocular observers, who are indicated by references Ob.1$^{iv}$ and Ob.2$^{iv}$ for example. The projectors 13 and 16 are adapted each to illuminate at least parts of the respective side portions (represented in the figures by screens 14 and 15) of the surface adapted to receive indicia. Each luminous point of the image thrown by projector 16 onto screen 15, and of the image thrown by projector 13 onto screen 14, emits through diffusion a beam of rays which after refraction by lens D' are kept parallel to the straight line that passes through the luminous point under consideration and also passes through the optical centre Ce.1 of lens D'. Separating partition 5' prevents the incidence on screen 14 of the rays coming from the projecting machine 16 and, in turn, the incidence on screen 15 of rays coming from projecting machine 13. When the angular stereoscopic view or a common stereoscopic view under projection is contained in the same film, the optical axis of the projection objective of the projector must coincide with axis X$_4$—X$_4$; consequently, projectors 16 and 13 will be replaced by a single machine, and; in this case, partition 5' may be suppressed. The aforementioned system of "angular stereoscopic relief" works as follows: By projecting the stereoscopical image corresponding to the right eye of each observer onto screen 15 by means of projector 16, and by simultaneously projecting the stereoscopical image that corresponds to the left eye of each observer onto screen 14 by means of projector 13, said images are formed clearly on the surface of the screens; in these conditions, after the luminous rays have been refracted in lens D', which as hereinbefore indicated, is positioned to provide an augmented image of the surface adapted to receive indicia, each eye of each observer Ob.1$^{iv}$ and Ob.2$^{iv}$ placed within the visual field, could receive a double image: however, as eliminating devices are fixedly mounted between each observation post and the lens means, and said devices each comprise a pair of immobile opaque members such as plates r.e (right-hand eliminating plate) and l.e (left-hand eliminating plate) said opaque members being fixedly located to intercept a side of the augmented image, corresponding to a side portion such as screen 14 or 15, of the surface adapted to receive indicia, said members come between and intercept the unnecessary and perturbing image, allowing the corresponding image to reach each eye, that is to say the right eyes of the observers will be reached only by the image projected over screen 15 and which is a positive copy of the right-hand view of an angular stereoscopic view or a common stereoscopic view, whereas the left eyes of the observers will be reached only by the image projected over screen 14 and which is a positive copy of the left-hand view of an angular stereoscopic view or a common stereoscopic view. As may be clearly understood from the foregoing, each observer's optical sensation will be stereoscopic or three-dimensional. By means of an adequate installation, this "angular stereoscopic relief" sensation may be perceived, simultaneously and by unaided sight, by numerous observers. Eliminating plates r.e and l.e must be of opaque material, and can be mounted and installed appropriately.

B.3 and E.1 represent the angles at which, from the optical centre Ce.1 of lens D', the width of the images projected onto screens 14 and 15, respectively, is seen, whereas A.3 is the angle at which, from point Ce.1, the height of both images is seen.

The size of the magnifying lens can be that which is most convenient; and therefore it is possible to adopt individual magnifying lens, one for each spectator, and provide a surface adapted to bear indicia as hereinbefore described, common to all the lens, situated preferably in the focal plane or focal surface of all said magnifying lens, on which surface will be disposed the images to be observed. In an installation as described, it is possible to provide luminous image projections, in respect to the image receiving screen and the observers, such as it is customary to provide in cinematographic halls.

Although only a preferred embodiment has been shown herein, it is to be understood that the invention is not limited to any specific construction, but might be embodied in various forms without departing from the spirit of the invention or the scope of the appended claims.

I claim:

1. In an optical system comprising a surface adapted to bear indicia, and including a pair of relatively wide side portions and a relatively narrow center portion, a projector adapted to illuminate at least parts of said side portions, a plurality of observation posts each for a binocular observer, and magnifying lens means positioned to provide an augmented image of said surface and of the indicia appearing thereon, visible from each of said observation posts, an eliminating device fixedly mounted between each observation post and the lens means, each eliminating device comprising a pair of immobile opaque members each fixedly located to intercept a side portion of said augmented image corresponding to a side portion of said surface, with respect to the respective observation post, whereby at each observation post monocular vision only of said side portions of the augmented image is obtained.

2. In an optical system comprising a surface adapted to bear indicia, and including a right-hand relatively wide side portion, a left-hand relatively wide side portion and a relatively narrow center portion, a projector adapted to illuminate at least parts of said side portions, an observation post for binocular observer having a right eye and a left eye, and magnifying lens means positioned to provide an augmented image of said surface and of the indicia appearing thereon, said image being visible from the observation post, a right-hand immobile opaque eliminating member fixedly mounted and located to intercept at the observation post vision by the right eye of said observer of the image of the right-hand side portion of said surface, and a left-hand immobile opaque eliminating member fixedly mounted and located to intercept at the observation post vision by the left eye of said observer of the image of the left-hand side portion of said surface, whereby monocular vision only of the opposite side portions of the augmented image is obtained by each eye.

TULIO HUMBERTO ANTONIO CORNALBA.

(References on following page)

REFERENCES CITED

The following references are of record in the file of this patent:

UNITED STATES PATENTS

| Number | Name | Date |
|---|---|---|
| 963,125 | Dyer et al. | July 5, 1910 |
| 1,349,018 | Terashima | Aug. 10, 1920 |
| 1,358,685 | Friedman | Nov. 9, 1920 |
| 1,506,524 | Hammond | Aug. 26, 1924 |
| 1,808,725 | Francisco | June 2, 1931 |
| 1,932,029 | Wright | Oct. 24, 1933 |
| 1,939,343 | Feil | Dec. 12, 1933 |
| 1,944,182 | Jones | Jan. 23, 1934 |
| 1,971,828 | Morton | Aug. 28, 1934 |
| 1,972,904 | Pritchard | Sept. 11, 1934 |
| 1,993,272 | Godwin | Mar. 5, 1935 |
| 2,007,018 | La Porte | July 2, 1935 |
| 2,045,120 | Carpenter | June 23, 1936 |
| 2,060,204 | Hammond | Nov. 10, 1936 |
| 2,101,121 | Wixon | Dec. 7, 1937 |
| 2,124,587 | Morrissey | July 26, 1938 |
| 2,252,467 | Luzzati | Aug. 12, 1941 |
| 2,273,512 | Caldwell et al. | Feb. 17, 1942 |